United States Patent [19]

Erickson et al.

[11] Patent Number: 6,067,457

[45] Date of Patent: *May 23, 2000

[54] METHOD FOR DYNAMICALLY ASSIGNING PRIORITY TO A CALL

[75] Inventors: Paul M. Erickson, Palatine; Peter M. Drozt, Bartlett; Glenn K. Lubin, Schaumburg, all of Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/640,197

[22] Filed: Apr. 30, 1996

[51] Int. Cl.[7] ............................................ H04Q 7/20
[52] U.S. Cl. .................................... 455/512; 455/509
[58] Field of Search .................... 455/512, 509, 455/516, 519, 521, 524, 527, 450, 452, 455

[56] References Cited

U.S. PATENT DOCUMENTS

| 4,788,543 | 11/1988 | Rubin | 455/527 |
|---|---|---|---|
| 5,025,254 | 6/1991 | Hess | 455/509 |
| 5,034,993 | 7/1991 | Sasuta et al. | 455/509 |
| 5,226,071 | 7/1993 | Bolliger et al. | 455/512 |
| 5,287,552 | 2/1994 | Sasuta et al. | 455/518 |
| 5,349,632 | 9/1994 | Nagashima | 455/452 |
| 5,442,634 | 8/1995 | Cizek | 455/451 |
| 5,457,735 | 10/1995 | Erickson | 455/450 |
| 5,537,684 | 7/1996 | Cassidy et al. | 455/512 |
| 5,548,631 | 8/1996 | Krebs et al. | 455/450 |
| 5,570,411 | 10/1996 | Sicher | 455/512 |
| 5,574,977 | 11/1996 | Joseph et al. | 455/450 |
| 5,615,249 | 3/1997 | Solondz | 455/512 |

*Primary Examiner*—Daniel S. Hunter
*Assistant Examiner*—Myron K. Wyche
*Attorney, Agent, or Firm*—George C. Pappas; Jeffrey K. Jacobs

[57] ABSTRACT

A priority scheme for a system that supports dispatch and telephone services whereby more important calls, of the type spanning across the same or multiple cells, are dynamically assigned higher positions in the queue for the next voice channel to become available. Less important calls are readily identified and can have their voice channel taken away, i.e., dropped, to provide a channel for an emergency call. The priority scheme also makes it possible to for the priority of call in progress to dynamically change, e.g., increasing priority over time so that its voice channel can't be taken away by a higher priority call, or decreasing priority of call as a function of time in progress.

8 Claims, 2 Drawing Sheets

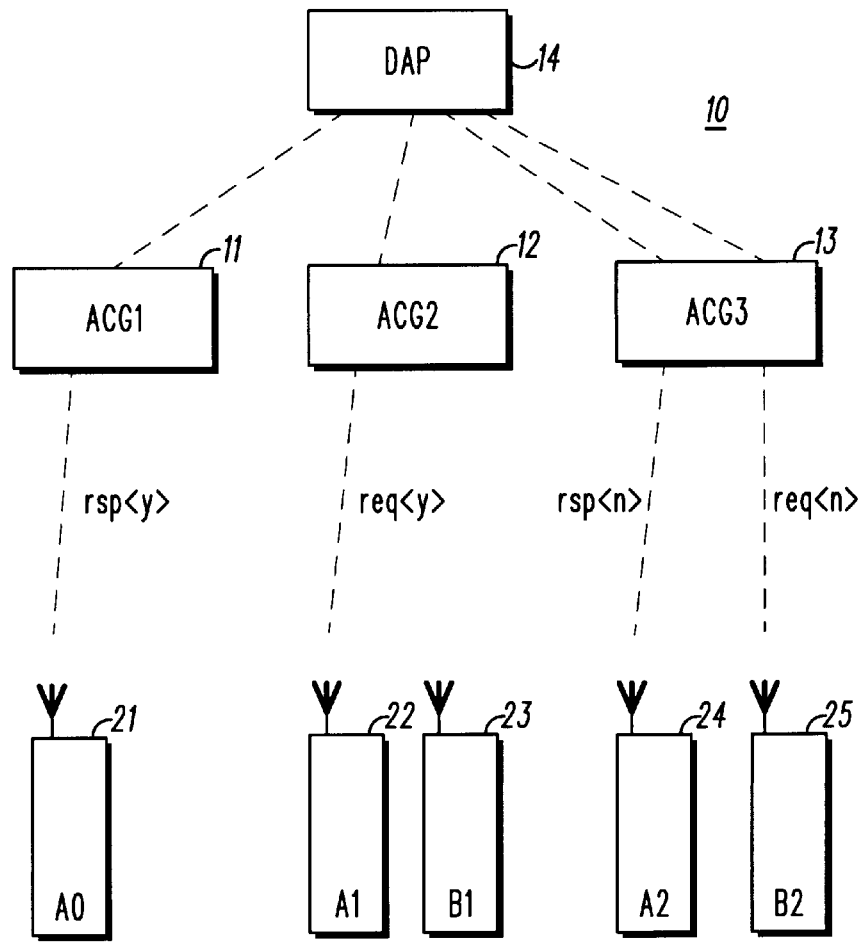

METHOD FOR DYNAMICALLY ASSIGNING PRIORITY TO A CALL

FIELD OF THE INVENTION

This invention relates generally to radio communications, and more particularly to radio communication services.

BACKGROUND OF THE INVENTION

Radio communication systems including communication systems that support both telephone services and dispatch services are known in the art. Such a system is disclosed for example in U.S. Pat. No. 5,457,735 entitled "Method and Apparatus for Queuing Radio Telephone Service Requests", by one of the co-inventors of the present invention. Typically, to support dispatch services, a dispatch application processor (DAP) is coupled to one or more access control gateways (ACGs). Each ACG, in turn is coupled to a plurality of radio base stations, with each base station supporting subscriber service over assigned channels within an associated coverage area or cell.

An ACG may also be coupled to a public switched telephone network, via a communications agent processor (CAP), to support telephone services to valid subscriber units in the cells associated with the particular ACG. Each ACG includes a digital computer having a queue memory and a program memory, the program memory having a program stored thereon to be executed by the digital computer. Typically, the ACG determines the radio services requested by a subscriber unit via the base stations and relays the request to the appropriate processor, i.e., to the CAP if the call type is interconnect or to the DAP if the call is a dispatch call (private dispatch call, group call, etc.). To support, therefore, the request for radio service from a system subscriber, an ACG receives resource allocation instructions, i.e., information to be used for resource allocation, from either the CAP or the DAP, and relays channel allocation information to the subscriber (via the base stations).

When a system subscriber sends out a request for dispatch service, the request is received on a primary control channel of at least one of the base stations and relayed to the associated ACG where a received message process begins. Assuming the request is valid and is for dispatch services, radio communication resources, if available, will be provided to connect the call with the called party or talk group. Should resources not be available, then a busy signal will be sent to the subscriber unit, the dispatch request will be put in a queue for an indeterminate period of time and a continuous loop started to repeatedly check whether resources are later available.

When the request is for telephone (interconnect call) service and a dedicated control resource is not presently available in the associated cell, a busy signal is sent by the ACG and depending on the communication system's overall priority scheme, the telephone request to/from a subscriber unit is terminated or optionally queued for a finite period of time, the finite period of time typically not exceeding a time that would likely lead an ordinary user to conclude that the request had somehow failed.

A typical priority scheme for dispatch and telephone service calls allows requests to be queued chronologically by the ACG in the order of occurrence, when resources are not available, and where the request at the top of the queue will be the next to be served when resources become available.

Alternatively, requests can be assigned a priority which is of higher or lower level than other requests and moved forward or backwards in non-chronological order in the queue as new requests arrive while waiting for resources to become available. For example, it is common to push telephone requests to the front of the ACG queue ahead of waiting dispatch service requests, but as explained above, only for a finite period of time (e.g., for 15 seconds), as they are deemed to be of high priority.

As another example, an emergency request may be assigned the highest priority, placed in the front of the ACG queue to be the next request served when resources become available.

Thus, each ACG has an associated priority scheme for processing radio requests by subscribers present in its associated cell. When a service request initiated by a subscriber over an available voice channel in one cell area is for a subscriber in another cell for which there is no available voice channel, the ACG associated with the initiating subscriber has no control over how the ACG associated with the called subscriber will prioritize service requests waiting for resources (voice channels) to become available.

A major drawback to this is that a voice channel which becomes available—in connection with a service request spanning multiple cells—may not always be given to the call best able to use it. For example, an ACG could have two queued requests—the first one (waiting longer) is just an initial request and the second is a responding radio waiting to join a call that already has voice transmission in one or more other cells. In such an instance, when a resource becomes available, the associated ACG will give the longer waiting call (higher priority) access to the voice channel resource, when from a system wide perspective, it might have been more prudent to give the voice channel to the second request in the queue. Conversely, if the first (longer-waiting) request in the queue was from a responding radio waiting to join a call already in progress for a long time, and the second request is an initial request to a talk group, many of the responding subscribers of which are in cells with more than enough available voice channels to participate in the talk group request, it might be considered better to give an available voice channel to the second request in the queue.

Prior art priority/queuing schemes, therefore, suffer the disadvantage of being static. That is, once an ACG-defined priority level is set for a specific group or individual during a call, that priority level remains constant throughout the call. Priorities are not allowed to change or be evaluated based on the call's progress or duration. As such, there is no facility available to allow a predefined priority level to dynamically change for calls involved in multiple-cell communications so that only that queued call which is most likely to benefit by obtaining a cell's next available resource in fact does so.

There is a need therefore to provide sufficient intelligence into the queuing process when requests for voice channels are queued in a cell such that when a voice channel becomes available it is given to the call that can gain the most benefit from it.

SUMMARY OF THE INVENTION

This need and others are substantially met by giving a network entity control of assigning priority as well as the ability to monitor a call's progress within a particular cell and/or across multiple cells.

The present invention aims to provide more important calls higher positions in the queue for the next available voice channel in a cell.

The present invention also makes possible readily identifying less important calls which can have their voice channel taken away, i.e., dropped, to provide a channel for an emergency call.

The present invention further makes possible dynamically changing the priority of call already in progress.

BRIEF DESCRIPTION OF THE DRAWINGS

FIG. 1 illustrates a communication system logical interface providing call processing among multiple cells utilizing a priority assignment scheme in accordance with the present invention;

FIG. 2 shows a call processing operation providing priority handling in accordance with the present invention.

DETAILED DESCRIPTION OF THE PREFERRED EMBODIMENTS

Figure 3:
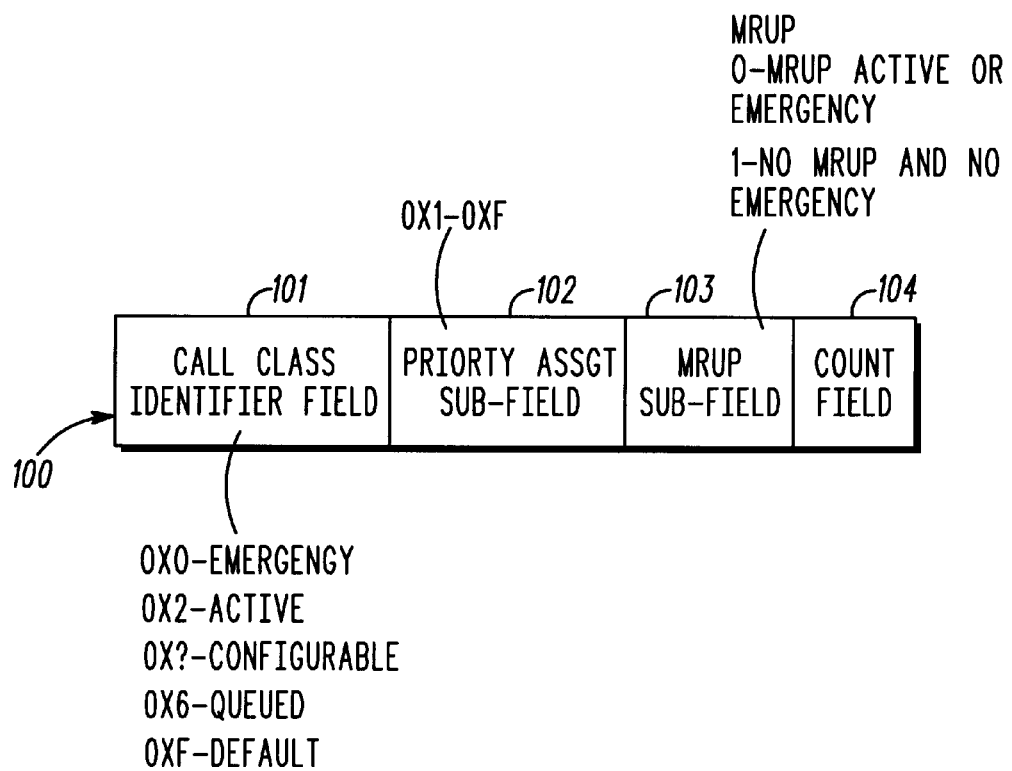
FIG. 3 is a graphical depiction of the priority data structure representative of an ACG queuing operation, including pertinent priority assignment parameter fields in accordance with the present invention.

The present invention can be more fully described with reference to FIG. 1, where there is depicted a multiple cell communication system 10 including a plurality of access control gateways 11–13 (ACG1, ACG2, ACG3, respectively), each associated with a cell and provided with at least a single channel.

The communication system 10 as shown is intended to support dispatch services only, but it should be readily understood from the discussion that follows that system 10 can be expanded to support telephone and other services. To support dispatch services across multiple cells, a dispatch application processor (DAP) 14 is coupled to the ACGs 11–13 as shown. ACGs 11–13 (represented individually as ACG1, ACG2, and ACG3, respectively) determine the radio services requested by the available corresponding subscriber units (A0), (A1, B1) and (A2, B2), respectively—also individually represented by corresponding reference numerals 21–25—via associated base stations (not shown) and relay the requests to the DAP 14. The DAP 14, in turn, sends resource allocation instructions, i.e., information to be used for resource allocation, to the ACGs 11–13 which relay channel allocation information to the subscriber units 21–25.

The present invention priority scheme and associated priority assignment data structure is best described with reference to an exemplary call processing operation shown in FIG. 2.

At a time t0, a subscriber unit B2 initiates a group call to all subscriber units belonging to GROUP B (B1, B2). Because it is assumed that there are no available voice channels in ACG3, ACG3 will queue the B2 call request for later service and the DAP 14 is informed of the queued action.

At a time t1, a subscriber unit A1 requests a group call to all subscriber units belonging to GROUP A (A0, A1, A2). Assuming a voice channel is available in the cell supported by ACG2, where subscriber unit A1 initiated the call, ACG2 will give the available voice channel to the requesting subscriber unit A1. ACG2 then informs the DAP 14 that it wishes to connect the resource assigned call to the GROUP A users in the other cells (ACG1 and ACG3).

At time t2, ACG3 receives the instruction from the DAP 14 but must defer the request to connect the A1 initiated call to GROUP A user A2 in the cell supported by ACG3, because there are no available voice channels in that cell. At this time, the pending group call response is queued for later service when a voice channel in ACG3 becomes available.

The DAP 14, in this regard, tracks the call activity among cells and passes status information to the ACGs in a manner which allows the ACGs to dynamically update the priority assignment level of all calls.

In the example of FIGS. 1 and 2, the DAP 14, at time t2, informs ACG3 of the existence of an established channel allocation at another unidentified cell (ACG2) initiated by subscriber unit A1, by setting a 'call class' data structure field for the A2 subscriber unit at ACG3 to active, as will be described in greater detail below in connection with the data structure shown in FIG. 3. This has the effect of dynamically assigning a higher priority to the A1 initiated call than that reserved for B2.

At time t3, ACG1 receives the same instruction from the DAP 14 and establishes a connection of the A1 initiated call to GROUP A user A0 located in the cell supported by ACG1. Again it is assumed that a voice channel was available in this cell at the time of this request. As a result, a call is started between A0 and A1.

At time t4, a resource becomes available in the cell supported by ACG3. At this time, ACG3 recognizes that both the initial 82 request (queued at time t1) and the A2 request for connection to the talk GROUP A (queued later at time t2) are requesting access to the voice channel. Although B2 was queued first, it makes more sense to let A2 join the currently active group call between A0 and A1 rather than let the pending GROUP B call start. Because ACG3 was informed of the status of the GROUP A call by the DAP 14 and dynamically assigned a higher priority to A2 than to B2 for access to an available voice channel, the later-queued subscriber unit A2 is given access to the voice channel and connection to the GROUP A call. This is drastically a different approach from the prior art which did not provide a means for reassigning the priority level of queued service requests within a particular cell as a call's status changed relative to changing events occurring in other cells.

An ACG, in accordance with the present invention, does not have access to the data base defining the priorities of the various dispatch groups. Therefore, initially an ACG will associate the lowest priority to a new private or group call request. When a voice channel becomes available, consideration of priority is unnecessary as all requests are honored as they arrive. However, in the more relevant case where resources are not available and there is a queue of pending requests, the ACG will tag the new request with the lowest priority and inform the DAP of the pending request.

At some time later, the ACG will receive from the DAP an indication of priority to associate with the pending call request. When an appropriate resource becomes available, the ACG will service the (serviceable) queued request with the highest priority.

The database with the assigned priorities is maintained at the DAP 14. However, an emergency priority call level, as will be explained below, may be requested by a subscriber through the appropriate subscriber unit ergonomics. A separate queue is maintained by each ACG 11–13 for its associated cell. As part of the call initialization processes, the DAP 14 indicates to the ACG the priority of the call being processed.

It should be appreciated that priority only differentiates between the requests queued for one cell within one ACG. There is no interaction between those requests queued for one cell and those of any other cell whether or not they are within the same ACG.

A proposed exemplary priority data structure 100 for dynamically tracking changing events to prioritize call requests by an ACG's 11–13 subscriber units so as to best benefit such units, is depicted generally in FIG. 3.

The illustrated data structure 100 is shown comprising four data fields, including a call class field, represented by reference numeral 101, and three additional, but non-essential data fields, represented by reference numerals 102–104, respectively.

The call class field 101 is used by an ACG to characterize, independently or in response to resource allocation instructions from the DAP, a call request as being one of an emergency type (highest priority), active (second highest priority), interconnect configurable (next highest priority and, in the preferred embodiment, the default position for interconnect calls), queued (normally queued for service in a predetermined queuing order), or of default type (lowest priority). All call requests are initially assigned default type (wait mode) priority by an ACG (assuming there are no voice channels available to immediately service the call), at least until such time a higher priority is assigned to that call by the DAP 14.

The active call class indicates that a voice channel is (or at least had once been) assigned in at least one other cell of the system. The active indicator is an indication that the initiator of the call had resources and since it is generally expected that at least one of the target subscriber units will obtain a voice channel, the active indication can be viewed as a likely indication that the users in this cell are missing audio from a call in progress, and thus should be given higher priority than for example a newly initiated call request having queued priority. Queued priority can be interpreted as meaning that a call request is waiting for a resource to become available for the initiator.

The second field 102 in the ACG data structure 100 is a priority assignment field (a static field) for assigning priorities to pending call requests within a particular call class. The third field 103 identifies a 'most recent user priority' (mrup) and is needed in a busy system when all of the voice channels are being used to allow continuity of communication. For example, when a new call is re-started shortly after a previous call involving the same group ends, the new call will be given higher priority. But if this priority has already been given to a group X number of times, mrup priority will not be given the X+1 st time. It should be appreciated that emergency calls are always given mrup priority.

The fourth field 104 is a count field which can serve as a time stamp indication of when a call came in. The ACG can dynamically alter a pending call-request's priority based on the call's progress as a function of duration since initiation was first sought, or as a function of time the talk group with which a particular pending call request was first started. The data structure hence described involves the assigning of priority based on very specific call request parameters.

The implementation of the presently described data structure 100 by the cooperation of each ACG (11–13) with the DAP 14 makes possible tracking which queued calls are the more important calls, of the type spanning across multiple cells, to receive the next available resource in a given cell. This is based on a set of predefined rules which take into consideration a call's progress in relation to other calls currently serviced or waiting to be serviced across the multiple-cell infrastructure of the communication system 10.

The data structure 100 implementation also makes possible readily identifying less important calls and prematurely terminating them so that the voice channels being used by this call can be used for more important calls, such as an emergency call. This would involve giving each call using a voice channel, a priority to be associated with it (as provided by the DAP). When an emergency call request is received by an ACG, it will attempt to reserve a voice channel at a default priority. In the preferred embodiment, the ACG is programmed so as not to assume this is a real emergency call request (and take away a voice channel from another call without input from the DAP) because it is possible that this request will not be allowed and a call may have been unnecessarily terminated.

Assuming no voice channel is available, the DAP will then set the appropriate values of the priority structure to zero, i.e., emergency, and will set remaining data structure fields (102–104) accordingly, e.g., it will set the priority assignment field 102 equal to zero (emergency); the mrup field 103 equal to zero (on); and an appropriate time stamp entry will be made in the count field 104 (see FIG. 3). The DAP 14 then sends page requests to all cells where subscriber units might be located to determine where they're located. In this message, the DAP will provide the priority structure. When the ACG that sent the request receives the page request, it will change its original default priority to that it just received. The ACG will also note the Call Class Emergency and realize that it needs to terminate the call which is using an appropriate voice channel and has the lower priority.

In the preferred embodiment, all calls which have voice channels assigned to them will have a Call Class value of Active. However, it is possible to expand the number of values so that there is more than one which can apply to calls which have voice channels. The ACG may, therefore, prematurely terminate the lowest priority call by switching the channel to an "unassigned" state which informs subscriber units that the call is over. The ACG could also inform the DAP that it lost the voice channel for this call. This voice channel is then assigned to the emergency call and the ACG will inform the DAP that it now has a voice channel for this call. The DAP will then continue to process the call as it would normally.

It should be appreciated that the dynamic priority assignment nature of the data structure described herein can also facilitate dynamically reconfiguring priority within a single cell site based on different factors. For example, within a given cell site, after a request has been queued for more than 15 seconds its Call Class priority could be increased automatically. In another example, the ACG identifying that some 'special' user has just registered to the system and is associated with a group that currently has a group call queued, could result in the ACG increasing the user's priority for access to the next available resource. As a third example, the DAP may realize that many requests are pending from different users in the same group in the same cell and the DAP may choose to elevate the priority for this call. As a final example, the DAP may want to decrease/increase the priority of a call which has been active for longer than 30 seconds and maybe again after a minute—hence the facility for changing the priority of a call in progress.

It is further to be understood that the priority scheme described herein for dynamically assigning priority to a call, may be implemented as a software algorithm.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a communication system, a method for dynamically assigning priority to incoming service requests competing for access to a next available resource, comprising the steps of:

queuing a first service request by a first subscriber in a queue;

queuing a second service request by a second subscriber in the queue, wherein queuing the first and second service request produces a queue order of the first and second requests in the queue; and dynamically changing the queue order of the first and second requests in the queue as a function of predefined criteria that determine which service request is most likely to benefit by obtaining access to the next available resource.

2. In a communication system, a method for dynamically changing the priority of a call already in progress, comprising the steps of:

assigning a priority level to an incoming service request;

establishing a connection to an available resource for the incoming service request when the incoming service request is highest in priority in relation to any pending service requests; and changing, after the step of establishing, the priority level of the service request for which a connection has been established as a function of predefined events.

3. The method of claim 2, wherein said step of changing the priority involves changing the priority as a function of the time lapsed since the connection was initially established.

4. The method of claim 3, wherein said step of changing the priority includes decreasing the priority as a function of time lapsed since the connection was initially established.

5. The method of claim 3, wherein said step of changing the priority includes increasing the priority as a function of time lapsed since the connection was initially established.

6. In a communication system, a method for prematurely terminating one of plural currently active service calls processed by an access control gateway (ACG), wherein each of the plural currently active service calls is associated with a priority level, the method comprising the steps of:

receiving, by the ACG, a service request from a subscriber requiring immediate access to a communication resource;

identifying, by the ACG, a need for immediate access;

changing the priority level of at least one of the plural currently active service calls;

determining, by the ACG, when a communication resource is not available, which of the currently active service calls is least important; and terminating, by the ACG, the least important currently active service call.

7. In a communication system including a plurality of access control gateways (ACGs), each supporting at least one cell and cooperatively coupled to a dispatch application processor (DAP), a method for assigning priority to a call involving subscribers present on multiple cells, comprising the steps of:

queuing, by an ACG, a first service request by a first subscriber in a first cell for access to a next available resource;

queuing, by the ACG, a second service request by a second subscriber in the first cell for access to the same next available resource, wherein queuing the first service request and the second service request produces a queue order of the first and second requests for access to a next available resource; and changing the queue order of the first and second requests on the basis of events occurring in another cell, wherein the first and second service requests remain queued for access to the same next available resource.

8. In a communication system including a plurality of access control gateways (ACGs), each supporting at least one cell and cooperatively coupled to a dispatch application processor (DAP), a method for prematurely terminating one of plural currently active service calls processed by an ACG, wherein each of the plural currently active service calls is associated with a priority level, the method comprising the steps of:

receiving, by the ACG, a service request from a subscriber requiring immediate access to a communication resource;

identifying, by the ACG, a need for immediate access;

changing the priority level of at least one of the plural currently active service calls;

determining, by the ACG, when a communication resource is not available, which of the currently active service calls is least important; and terminating, by the ACG, the least important currently active service call.

* * * * *